(12) United States Patent
Petrosky

(10) Patent No.: US 12,202,126 B2
(45) Date of Patent: Jan. 21, 2025

(54) ARTICULATED MANIPULATOR FOR NAVIGATING AND SERVICING A HEAT EXCHANGER

(71) Applicant: Westinghouse Electric Company LLC, Cranberry Township, PA (US)

(72) Inventor: Lyman J. Petrosky, Latrobe, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 584 days.

(21) Appl. No.: 16/891,423

(22) Filed: Jun. 3, 2020

(65) Prior Publication Data
US 2021/0383937 A1   Dec. 9, 2021

(51) Int. Cl.
*F22B 37/48* (2006.01)
*B25J 15/00* (2006.01)
(Continued)

(52) U.S. Cl.
CPC .............. *B25J 15/04* (2013.01); *B25J 15/00* (2013.01); *B25J 15/0019* (2013.01); *B25J 15/08* (2013.01); *F22B 37/006* (2013.01); *F22B 37/002* (2013.01)

(58) Field of Classification Search
CPC ........ F22B 37/48; F22B 37/486; F22B 37/54; B25J 9/0018; B25J 9/06; B25J 15/04;
(Continued)

(56) References Cited

U.S. PATENT DOCUMENTS 4,168,782 A * 9/1979 Sturges, Jr. ........... F22B 37/006
414/800
4,561,816 A * 12/1985 Dingess .................... B25J 15/04
901/41
(Continued)

FOREIGN PATENT DOCUMENTS

EP         6339 A  *  1/1980  ............ F22B 37/003
EP   0009121 A1 *  4/1980
(Continued)

OTHER PUBLICATIONS

International Search Report and Written Opinion for International PCT Application No. PCT/US2021/035680, dated Oct. 18, 2021.
(Continued)

*Primary Examiner* — Gregory A Wilson
(74) *Attorney, Agent, or Firm* — K&L Gates LLP

(57) ABSTRACT

A manipulator configured to navigate a heat exchanger including a plurality of tubes extending through a tubesheet is disclosed herein, the manipulator including a first end effector, a second end effector, and an articulation assembly. The first end effector is configured to accommodate an instrument configured to service the heat exchanger and includes a first actuator configured to extend a first gripper into a tube of the plurality of tubes. The second end effector includes a second actuator configured to extend a second gripper into a tube of the plurality of tubes. The first and second gripper are configured to secure the manipulator to the tubesheet, and, when the second gripper is securing the manipulator to the tubesheet, the articulation assembly is
(Continued)

configured to enable the first end effector to move relative to the second end effector in a plane that is parallel to the tubesheet.

22 Claims, 8 Drawing Sheets

(51) Int. Cl.
*B25J 15/04* (2006.01)
*B25J 15/08* (2006.01)
*F22B 37/00* (2006.01)
*F22B 37/54* (2006.01)

(58) Field of Classification Search
CPC ...... B25J 15/0019; B25J 15/00; B25J 9/0087; G21D 1/02; G21D 1/006
See application file for complete search history.

(56) References Cited

U.S. PATENT DOCUMENTS

| 5,355,063 | A | * | 10/1994 | Boone | B25J 9/1025 |
| | | | | | 318/605 |
| 7,314,343 | B2 | * | 1/2008 | Hawkins | F22B 37/006 |
| | | | | | 180/8.5 |
| 8,938,044 | B2 | * | 1/2015 | Petrosky | F22B 37/006 |
| | | | | | 165/11.2 |
| 9,341,366 | B2 | | 5/2016 | Fujita et al. | |
| 10,780,588 | B2 | * | 9/2020 | Smith | B25J 15/0475 |
| 2004/0131462 | A1 | | 7/2004 | Hawkins et al. | |
| 2012/0095596 | A1 | * | 4/2012 | Cole | B25J 9/144 |
| | | | | | 901/29 |
| 2015/0081092 | A1 | | 3/2015 | Jacobsen et al. | |
| 2016/0049210 | A1 | | 2/2016 | Filippone et al. | |

FOREIGN PATENT DOCUMENTS

| EP | 0484173 A2 * | 5/1992 |
| EP | 2525368 A1 | 11/2012 |
| JP | H0343167 A | 2/1991 |
| JP | 6336986 B2 | 6/2018 |
| TW | M582893 | 9/2019 |

OTHER PUBLICATIONS

Search Report for corresponding Taiwan Application No. 110120216, dated Dec. 23, 2021.

* cited by examiner

ARTICULATED MANIPULATOR FOR NAVIGATING AND SERVICING A HEAT EXCHANGER

FIELD

The present disclosure is generally related to nuclear power electrical generation plants and, more particularly, is directed to an articulated robotic device configured to navigate, and service a heat exchanger within a nuclear steam generator.

SUMMARY

The following summary is provided to facilitate an understanding of some of the innovative features unique to the aspects disclosed herein, and is not intended to be a full description. A full appreciation of the various aspects can be gained by taking the entire specification, claims, and abstract as a whole.

In various aspects, a manipulator configured to navigate a heat exchanger including a plurality of tubes extending through a tubesheet is disclosed. The manipulator includes a first end effector configured to accommodate an instrument configured to service the heat exchanger, wherein the first end effector includes a first actuator coupled to a first gripper, wherein the first actuator is configured to extend the first gripper into a tube of the plurality of tubes, and wherein the first gripper is configured to secure the manipulator to the tubesheet. The manipulator also includes a second end effector including a second actuator coupled to a second gripper, wherein the second actuator is configured to extend into a tube of the plurality of tubes, and wherein the second gripper is configured to secure the manipulator to the tubesheet. The manipulator also includes an articulation assembly including a first link and a second link, wherein the first link is pivotally connected to the first end effector and rotatable about a first axis, wherein the first link is pivotally connected to the second link and rotatable about a second axis, and wherein the second link is pivotally connected to the second end effector and rotatable about a third axis. When the second gripper is securing the manipulator to the tubesheet, the articulation assembly is configured to enable the first end effector to move relative to the second end effector in a plane that is parallel to the tubesheet.

In various aspects, a system configured to service a heat exchanger including a plurality of tubes extending through a tubesheet is disclosed. The system includes a manipulator including a first end effector configured to accommodate an instrument configured to service the heat exchanger, wherein the first end effector includes a first actuator coupled to a first gripper, wherein the first actuator is configured to extend the first gripper into a tube of the plurality of tubes, and wherein the first gripper is configured to secure the manipulator to the tubesheet, a second end effector including a second actuator coupled to a second gripper, wherein the second actuator is configured to extend into a tube of the plurality of tubes, and wherein the second gripper is configured to secure the manipulator to the tubesheet, and an articulation assembly including a first link, a second link, and three joint axis motors, wherein the first link is pivotally connected to the first end effector and rotatable about a first axis, wherein the first link is pivotally connected to the second link and rotatable about a second axis, and wherein the second link is pivotally connected to the second end effector and rotatable about a third axis. The system further includes a control circuit coupled to the first end effector, the second end effector, and the articulation assembly, wherein control circuit is configured to command the motor to move the first end effector relative to the second end effector in a plane that is parallel to the tubesheet, based on an instruction.

In various aspects, a method of servicing a heat exchanger including a plurality of tubes extending through a tubesheet is disclosed. The method employs a manipulator including a first end effector configured to accommodate an instrument configured to service the heat exchanger, wherein the first end effector includes a first actuator configured to extend a first gripper into a tube of the plurality of tubes, a second end effector configured to accommodate an instrument configured to service the heat exchanger, wherein the second end effector includes a second actuator configured to extend a second gripper into a tube of the plurality of tubes, and an articulation assembly including a first link, a second link, and a motor configured to move the first end effector relative to the second end effector in a plane that is parallel to the tubesheet, wherein the first gripper and second gripper are configured to secure the manipulator to the tubesheet. The method includes extending the second gripper into a tube of the plurality of tubes, securing, by the second gripper, the manipulator to the tubesheet, moving, by the motors, the first end effector relative to the second end effector in a plane that is parallel to the tubesheet, until the first end effector arrives at a first desired location; and servicing, by the first instrument, the heat exchanger at the first desired location.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Various features of the aspects described herein are set forth with particularity in the appended claims. The various aspects, however, both as to organization and methods of operation, together with advantages thereof, may be understood in accordance with the following description taken in conjunction with the accompanying drawings as follows:

Corresponding reference characters indicate corresponding parts throughout the several views. The exemplifications set out herein illustrate various aspects of the invention, in one form, and such exemplifications are not to be construed as limiting the scope of the invention in any manner.

DETAILED DESCRIPTION

Figure 1:
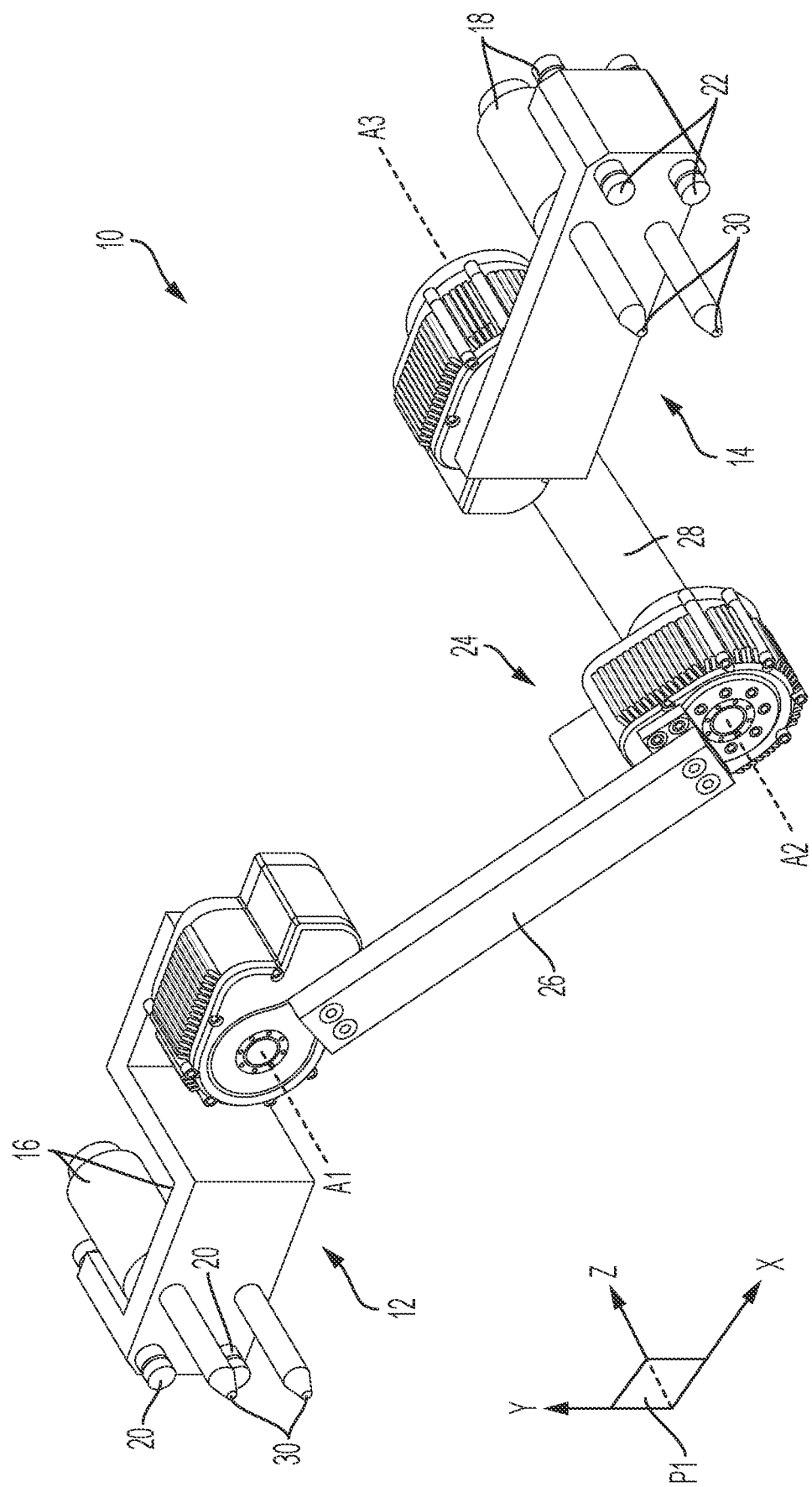
FIG. 1 illustrates an isometric view of an articulated device configured to service a heat exchanger of a nuclear power electrical generation plants, in accordance with at least one non-limiting aspect of the present disclosure.

Numerous specific details are set forth to provide a thorough understanding of the overall structure, function, manufacture, and use of the aspects as described in the disclosure and illustrated in the accompanying drawings. Well-known operations, components, and elements have not been described in detail so as not to obscure the aspects described in the specification. The reader will understand that the aspects described and illustrated herein are non-limiting examples, and thus it can be appreciated that the specific structural and functional details disclosed herein may be representative and illustrative. Variations and changes thereto may be made without departing from the scope of the claims. Furthermore, it is to be understood that such terms as "forward", "rearward", "left", "right", "upwardly", "downwardly", and the like are words of convenience and are not to be construed as limiting terms. Furthermore, it is to be understood that such terms as "forward", "rearward", "left", "right", "upwardly", "downwardly", and the like are words of convenience and are not to be construed as limiting terms.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Before explaining various aspects of the articulated manipulator in detail, it should be noted that the illustrative examples are not limited in application or use to the details of construction and arrangement of parts illustrated in the accompanying drawings and description. The illustrative examples may be implemented or incorporated in other aspects, variations, and modifications, and may be practiced or carried out in various ways. Further, unless otherwise indicated, the terms and expressions employed herein have been chosen for the purpose of describing the illustrative examples for the convenience of the reader and are not for the purpose of limitation thereof. Also, it will be appreciated that one or more of the following-described aspects, expressions of aspects, and/or examples, can be combined with any one or more of the other following-described aspects, expressions of aspects, and/or examples.

The present disclosure is directed to an articulated manipulator configured to navigate and service any heat exchanger with a planar tubesheet. Many mechanical systems, such as nuclear electrical power generators, rely on the effective dissipation of heat. For example, in a pressurized water reactor, the heat generated by the nuclear reaction may be absorbed by a primary coolant that circulates through the reactor core and is utilized to generate steam in a steam generator. The steam generator can be configured as an upright cylindrical pressure vessel with hemispherical end sections. A traverse plate called a tubesheet, located at the lower end of the cylindrical section, can divide the steam generator into a primary side, or lower hemispherical section below the tubesheet, and a secondary side, a corresponding section positioned above the tubesheet. A vertical wall may bisect the primary side into an inlet section and an outlet section. The tubesheet can include a thick carbon steel plate with an array of thousands of holes into which are inserted the ends of U-shaped tubes. A first end of each U-shaped tube can be inserted into a hole within the primary side of the tubesheet that communicates with an inlet section. A second end of the U-shaped tube can be inserted into a hole within the tubesheet that communicates with an outlet section. Accordingly, a coolant can be pressurized and introduced into the inlet section, circulate through the U-shaped tubes, and exit through the outlet section. Additionally, water can be introduced into similar configuration of the secondary side of the steam generator, circulate around the U-shaped tubes, turning into steam by heat given up by the primary coolant. Although the present disclosure describes aspects in which an articulated manipulator can be used to service a heat exchanger within a nuclear power electrical generation plant, such aspects are merely exemplary. Thus, it will be appreciated that the articulated manipulator can be implemented to navigate and service any heat exchanger with a planar tubesheet.

In time, degradation can occur within the material of U-shaped tubes. This is undesirable because the primary coolant is radioactive and any leakage of the coolant into the secondary side of the generator can contaminates the steam. Because of the radiation hazard present in nuclear powered steam generators, it is preferable to remotely inspect and/or service the U-shaped tubes to minimize the risk of detrimental exposure of personnel. Consequently, a number of robotic systems have been developed to inspect and/or service such configurations of heat exchanger tubes. Such robotic systems can include a motorized transport subsystem configured to position an "end effector" of the robot in a desired location of mechanical system, such as the heat exchanger. The end effector can be outfitted with a variety specialized tools designed to service the mechanical system, thereby mitigating the aforementioned risk of exposure of personnel.

One such robot is disclosed in U.S. Pat. No. 7,314,343, the disclosure of which is hereby incorporated by reference in its entirety. Another robotic arm configured service heat exchangers is the ROSA (Remotely Operated Service Arm) developed by Westinghouse Electric Corporation located in Pittsburgh, Pa. However, as heat exchanger technology evolves, the versatility and efficiency of known robots can be improved. Tube sizes are decreasing and a variety of heat exchanger designs and thus, tubesheet configurations have been developed and implemented for specific applications. For example, square and triangular pitch tubesheet configurations are commonly used creating difficulty for known robots to be universally implemented across a variety of systems. Manufacturing defects can also preclude known robots from servicing the tubesheet, thereby necessitating manual repositioning and increasing the risk of human exposure to potentially hazardous radiation. Additionally, given the complex and extensive network of tubes involved in such heat exchangers, time can be of the essence to optimize the service of such systems. As such, there is a need for a manipulator with improved articulation and geometric versatility. Such a manipulator should be include an articulation system capable of traversing heat exchangers of varying configurations, avoiding the inevitable manufacturing defects without human intervention, and efficiently servicing a tubesheet due to its improved range of motion.

Referring now to FIG. 1, an isometric view of an articulated manipulator 10 is illustrated in accordance with at least one non-limiting aspect of the present disclosure. As will be described, the manipulator 10 is particularly configured to efficiently navigate and service any heat exchanger with a planar tubesheet. For example, the manipulator 10 of FIG. 1 can be employed to service a heat exchanger of a nuclear power generation system, and more specifically, a tubesheet of the heat exchanger comprising a plurality of tubes. As used herein, the term "service" shall be broadly interpreted to describe a variety of procedures associated with the nuclear power generation. For example, the manipulator 10 can be specifically configured to inspect the tubesheet using a wide variety of non-destructive testing methods, including but not limited to Eddy Current Testing. Additionally and/or alternatively, the manipulator 10 can be specifically configured to perform any number of maintenance operations on the tubesheet of the heat exchanger. Although the aspects described herein are specifically directed to manipulators 10 configured to service the tubes terminating in the tubesheets of heat exchangers, it shall be understood that, in other non-limiting aspects, the manipulator 10 can be similarly deployed in various other systems that utilize heat exchangers with planar tubesheets, not to be limited to nuclear power generation plants.

According to the non-limiting aspect of FIG. 1, the manipulator 10 can include a first end effector 12 and a second end effector 14. A first pair of actuators 16 and a first pair of guide tubes 20 can be coupled to the first end effector 12, and a second pair of actuators 18 and a second pair of guide tubes 22 can be coupled to the second end effector 14. The guide tubes 20, 22 can be configured to accommodate an instrument configured to service the heat exchanger. However, in other non-limiting aspects, the end effectors 12, 14 can be configured to accommodate an instrument configured to service the heat exchanger without the guide tubes 20, 22. For example, instruments can be directly attached to the end effectors 12, 14 through mechanical coupling. Alternatively, the end effectors 12, 14 can include modular connectors to interchangeably accommodate a wide variety of instruments. Alternatively and/or additionally, the manipulator 10 can be modularly configured such that the end effectors 12, 14 themselves can be interchangeably removed and attached in accordance with the intended application and/or user preference. The end effectors 12, 14 can include different grippers, instruments, and/or instrumentation configurations, and can be swapped out to accomplish a wide variety of tasks.

The manipulator 10 if FIG. 1 also includes an articulation system 24 comprising a first link 26 and a second link 28 pivotally connected to the first end effector 12 and second end effector 14, respectively. Although the non-limiting aspect of FIG. 1 depicts an articulated manipulator 10 with two end effectors, 12, 14, each having a pair of actuators 16, 18 and a pair of guide tubes 20, 22, in other non-limiting aspects, the manipulator includes any number of end effectors configured with any number of actuators and/or guide tubes, as is necessary for the specific implementation of the device.

In further reference of FIG. 1, the first end effector 12 and second end effector 14 each have a pair of actuators 16, 18 configured to extend and retract relative to the end effector itself. In some aspects, one or more actuator can be outfitted with a gripper configured to secure the manipulator 10 to the tubesheet. For example, in the non-limiting aspect of FIG. 1, each of the first actuators 16 and the second actuators 18 has a gripper 30 configured to be inserted into a hole of the tubesheet. As will be described in further detail, each of the grippers 30 can be subsequently moved along a lateral axis L (FIG. 2) that runs perpendicular to the axis of extension and/or retraction until at least one of the grippers 30 comes into contact with an inner wall of the hole. In the non-limiting aspect of FIG. 1, each of the first pair of actuators 16 and each of the second pair of actuators 18 can include a gripper 30 that can move laterally after being extended and inserted into a hole of the tubesheet. For example, each of the grippers 30 of an end effector 12, 14 may move towards one another until they contact and apply an inward pressure on an inner wall of their respective hole. Alternatively and/or additionally, the grippers 30 of each end effector 12, 14 may move laterally away from one another, until they contact and apply an outward pressure on an inner wall of their respective hole. Accordingly, through the use of an applied pressure and/or friction between the gripper 30 and inner wall, at least one of the end effectors 12, 14 of the manipulator 10 can be anchored to the tubesheet. The present disclosure contemplates multiple aspects with varying configurations of actuators 18, 20 and grippers 30 to grip the tubesheet in a specific way, depending on the particular needs of the application and/or preferences of the user.

Still referring to FIG. 1, the manipulator 10 can be configured such that the first end effector 12 moves into place via the articulation system 24 once the second end effector 14 is anchored to the tubesheet. For example, the articulation system 24 of FIG. 1 includes a first link 26 pivotally connected to the first end effector 12 and a second link 28, which is in turn pivotally connected to the second end effector 14. Accordingly, the first link 26 can rotate relative to the first end effector 12 about a first axis A1, the first link 26 and second link 28 can rotate relative to the other about a second axis A2, and the second link 28 can rotate relative to the second end effector 14 about a third axis A3. Accordingly, the articulation assembly 24 can enable the first end effector 12 and/or second end effector 14 to move between a wide array of coordinates within a desired plane, depending on which end effector is anchored to the tubesheet.

For example, the articulation assembly 24 of FIG. 1 can enable the first end effector 12 to rotate about the first axis A1 and the first link 26 to rotate about the second axis A2 when the second pair of actuators 18 of the second end effector 14 is gripping the tubesheet, such that the manipulator 10 can move anywhere within a plane P1 defined by the X and Y axes. In the non-limiting aspect of FIG. 1, the plane P1 is parallel to the tubesheet, and the first end effector 12 and/or second end effector 14 can be repositioned to any desired X, Y coordinate within the plane P1. Although the articulation assembly 24 includes a first link 26 and a second link 28 and three axes A1, A2, A3, in other non-limiting aspects contemplated by the present disclosure, the articulation assembly 24 of manipulator 10 can include any number of links and axes to specifically tailored for a variety of applications and/or user preferences. The articulation assembly 24 of the manipulator 10 can provide an improved range of motion over existing manipulators with fewer axes of motion. Additionally and/or alternatively, the articulation assembly 24 can allow the manipulator 10 of FIG. 1 to traverse between coordinates using fewer motions, thereby promoting efficiency. Accordingly, the manipulator 10 of FIG. 1 is more effective and can perform a wider array of tubesheet services, including inspection and/or maintenance procedures.

The manipulator 10 can be configured to engage with at least one instrument depending on the intended application and/or user preference. For example, in the non-limiting aspect of FIG. 1, the manipulator 10 can include a first pair of guide tubes 20 installed within a guide block of the first end effector 12 and a second pair of guide tubes 22 installed within a guide block of the second end effector 14. The guide tubes 20, 22 can include hollow tubes extending through the end effectors 12, 14. In some non-limiting aspects, the guide tubes can include additional components, such as flexible conduits and/or fittings to ensure a proper engagement with and positioning of an inserted instrument. Accordingly, the guide tubes 20, 22 of FIG. 1 can be configured to accommodate and guide externally inserted probes, or any other instrument suitable for the intended application, to ensure proper placement for inspection and/or servicing of the heat exchanger. However, in other non-limiting aspects, any instrument suitable for the intended application can be mechanically coupled to the end effectors 12, 14. In such aspects, the mechanical connection can be modular such that a multitude of interchangeable instruments can be mechanically coupled to the manipulator 10, according to user preference. In still other non-limiting aspects, the guide tubes 20, 22 of manipulator 10 can include actuators configured to extend and/or retract instruments without external influence.

The manipulator 10 and, more specifically, the guide tubes 20, 22 of FIG. 1 are configured to accommodate probes configured for non-destructive testing of a tubesheet of a heat exchanger, such as Eddy-current testing. Accordingly, the manipulator 10 can inspect a heat exchanger by articulating to a desired position such that probes can be inserted into the guide tubes 20, 22. The probes can then induce an electromagnetic field, which can be used to detect and characterize surface and sub-surface flaws present throughout a conductive material of the tubesheet and more generally, the heat exchanger itself. Thus, the manipulator 10 of FIG. 1 can be used to improve compliance to regulations for nuclear power electrical generation plants, which require frequent eddy-current testing. However, Eddy-current testing is only one example of the testing contemplated by the present disclosure. In other non-limiting aspects, the guide tubes 20, 22 can accommodate instruments configured for any means of testing, inspection, and/or service.

For example, in some non-limiting aspects, the manipulator 10 can include a plugging tool, a welder, saw, and/or any other instrument configured to interact with or service the heat exchanger on one or more of the end effectors 12, 14. In some non-limiting aspects, the tools can be remotely operated. In other non-limiting aspects, the manipulator 10 can include any combination of instruments. For example, the first pair of guide tubes 20 can be configured to accommodate a pair of guide tubes 20 configured to inspect the tubesheet, and the second pair of guide tubes 22 can be configured to accommodate an instrument configured to service the heat exchanger. Additionally and/or alternatively, the guide tubes 20, 22 of the manipulator 10 can be modular and capable of accommodating any number of interchangeable instruments. The varying configurations contemplated by the present disclosure further enhance the productivity of the manipulator 10 and reduce the need for separate manipulators 10 to perform different tasks on the same tubesheet.

Because the manipulator 10 can include guide tubes 20, 22 on each of its end effectors 12, 14, the manipulator 10 of FIG. 1 can more efficiently service the heat exchanger. This further reduces the number of motions required by known manipulators, thereby enhancing the productivity of the manipulator 10. In the non-limiting aspect of FIG. 1, the manipulator 10 can be configured to position the guide tubes 20, 22 and/or other instruments relative to the tubesheet, once the manipulator 10 has been properly positioned and secured. For example, in the non-limiting aspect of FIG. 1, a user can insert an external probe into the guide tubes 20, 22, which are configured to engage with and guide the probe to a proper position on the tubesheet to inspect the heat exchanger. However, in other non-limiting aspects, the guide tubes 20, 22 can include actuators to facilitate the extension and retraction of an instrument relative to the heat exchanger. In still other non-limiting aspects, instruments can be mechanically coupled to the end effectors 12, 14 and the manipulator 10 itself can be configured to move towards and away from the heat exchanger. Regardless, the manipulator 10 can be appropriately configured to properly orient a wide variety of instruments relative to the heat exchanger for the required inspection and/or service.

Figure 2:
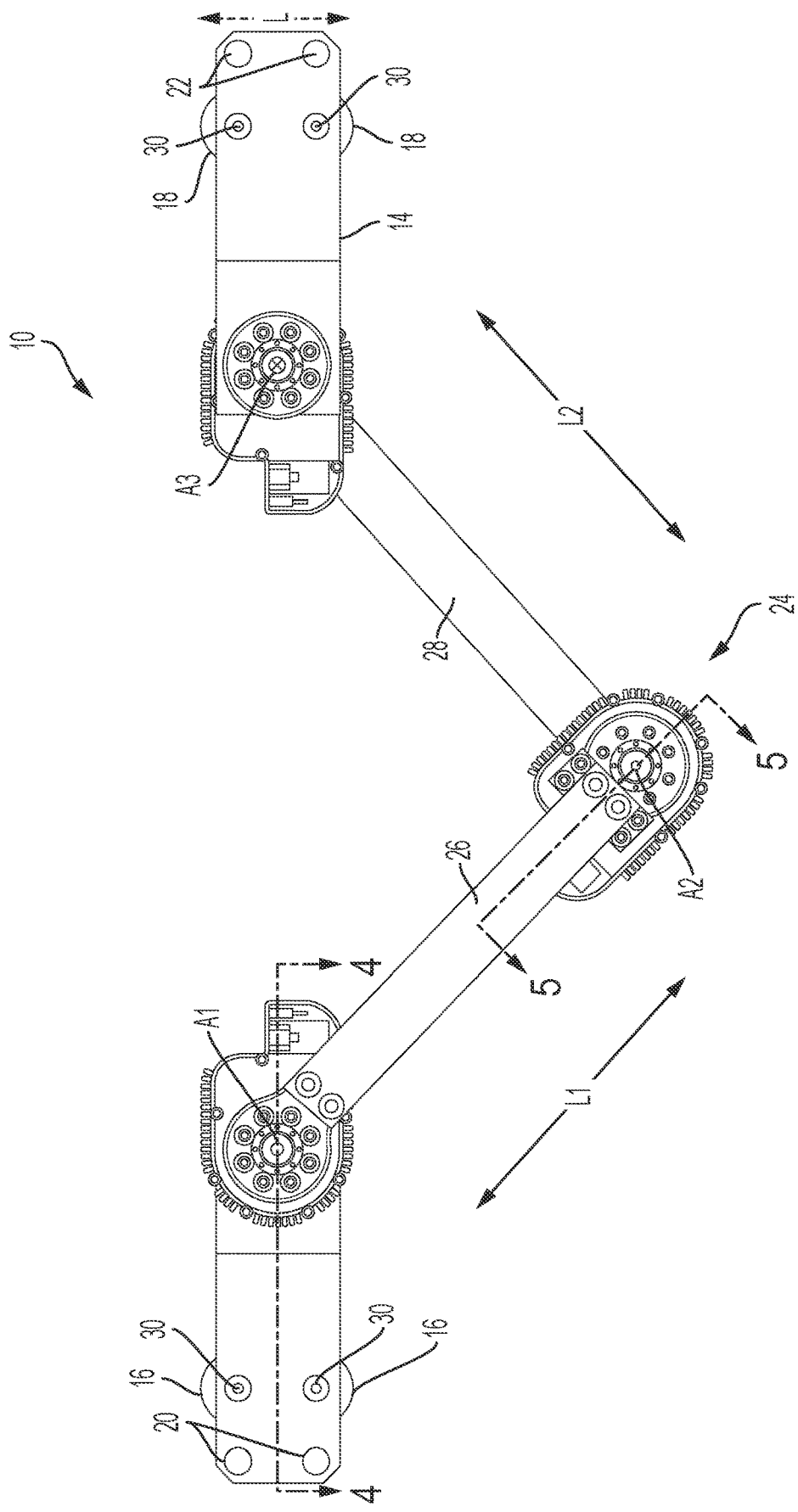
FIG. 2 illustrates a plan view of the articulated manipulator of FIG. 1.

Referring now to FIG. 2, a plan view of the articulated manipulator 10 of FIG. 1 is illustrated as seen from the tubesheet of a heat exchanger. Notably, the axes A1, A2, A3 of the articulation assembly 24 highlight the full range of motion afforded to the manipulator 10. It will be appreciated that the manipulator can position the first end effector 12 and second end effector 14 in a wide array of positions relative to one another. Therefore, if the second end effector 14 is secured to the tubesheet, the first end effector 12 can service tubes within a specifically configured radius defined by a length L1 of the first articulation link 26 and a length L2 of the second articulation link 28. Thus, the articulation assembly 24 can be configured to reduce the number of maneuvers the manipulator 10 is required to perform in order to service the entire tubesheet. Additionally and/or alternatively, the geometry of the first end effector 12 and second end effector 14 can be further configured to promote efficiency, depending on the intended application and/or preference of the user.

In further reference to FIG. 2, the lateral axis L is illustrated. According to the non-limiting aspect of FIGS. 1 and 2, the grippers 30 can be configured for lateral movement along the L-axis in order to apply the required pressure to an inner wall of a tube of the tubesheet to secure the manipulator 10 in place. However, in other non-limiting aspects, the grippers can be configured to move in any particular direction. In still other non-limiting aspects the grippers 30 can secure the manipulator 10 to the tubesheet in a variety of ways, including but not limited to magnetic, suction, and/or other forms of mechanical attachment, including combinations thereof. Thus, the grippers 30 can be configured to move as required to properly secure the manipulator 10 to the tubesheet, depending on the means of mechanical attachment.

Figure 3:
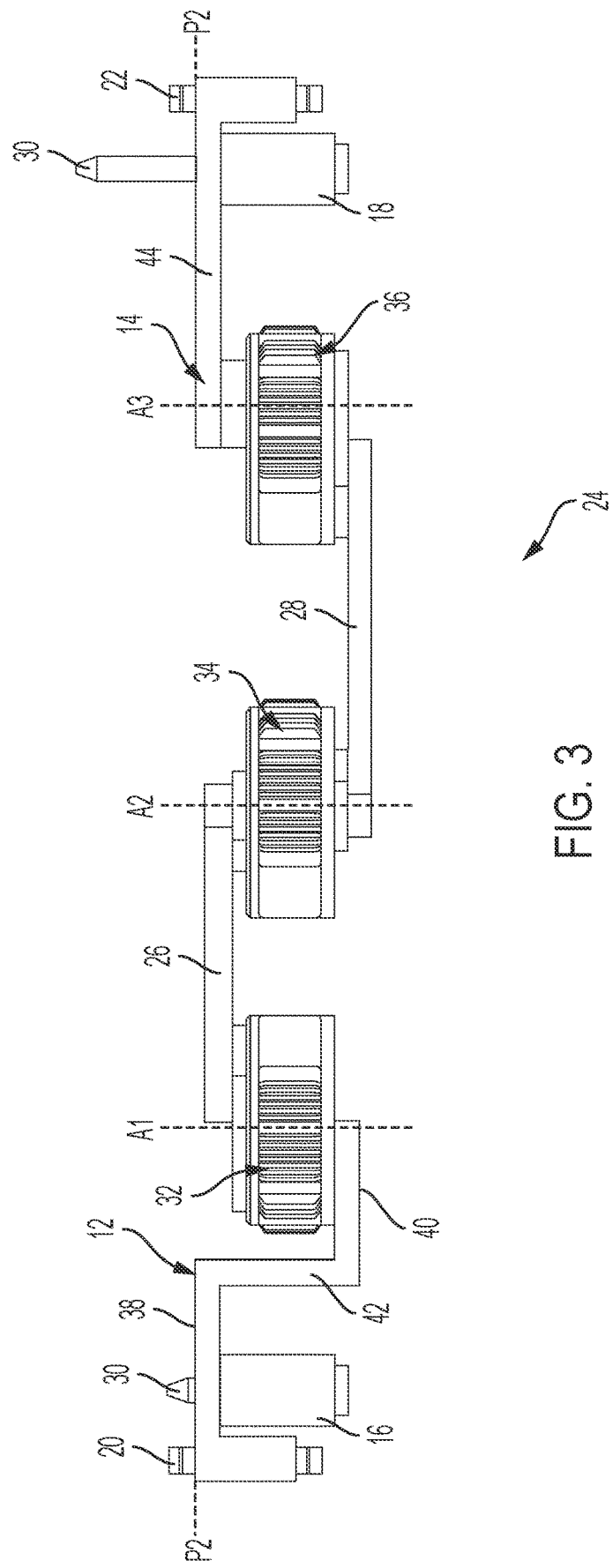
FIG. 3 illustrates an elevation view of the articulated manipulator of FIG. 1.

Referring now to FIG. 3, an elevation view of the articulated manipulator 10 of FIGS. 1 and 2 is depicted in accordance with at least one non-limiting aspect of the present disclosure. In the elevation view of FIG. 3, one of the grippers 30 of the second end effector 14 is depicted as extended by the one actuator 18 of the pair of actuators, presumably gripping a hole of the tubesheet. Specifically, the geometric orientation of the first end effector 12 relative to the first link 26, the first link 26 relative to the second link 28, and the second link 28 relative to the second end effector 14 can be intentionally configured depending on the intended use of the manipulator 10 and/or user preference. For example, according to the non-limiting aspect of FIG. 3, the first end effector 12 can be configured as a multi-planar bracket, including a first surface 38 and a second surface 40 orthogonally connected to the first surface 38 by a central component 42. The first pair of actuators 16 can be mounted on an underside of the first surface 38, which can be further configured to include a block into which the guide tubes 20 and/or other instruments can be installed. The second surface 40 is pivotally connected to the first link 26 of the articulation assembly 24 via a first motor assembly 32. The first link 26 can be pivotally connected to the second link 28 via a second motor assembly 34.

In further reference to FIG. 3, the second end effector 14 can be pivotally connected to the second link 28 via a third motor assembly 36. According to the non-limiting aspect of FIG. 3, the second end effector 14 can further include a first surface 44. Similar to the first end effector 12, the second pair of actuators 18 can be mounted on an underside of the first surface 44, which can be further configured to include a guide tube 22 into which probes and/or other instruments can be installed. Accordingly, the first surface 38 of the first end effector 14 and the first surface 44 of the second end effector 14 can be configured to exist in the same plane P2, which is parallel to both the plane P1 in which the manipulator 10 is configured to move, and a planar face of the tubesheet. Accordingly, the manipulator 10 of FIG. 3 is specifically designed such that the starting point of the grippers 30 and/or guide tubes 20, 22 is uniform for both the first end effector 12 and second end effector 14. This can simplify the dynamics of the maneuvers the manipulator 10 must perform to efficiently service the heat exchanger, which can further reduce time and processing resources. Additionally, the geometric configuration depicted in FIG. 3 can assist the manipulator 10 in navigating various manufacturing defects of the tubesheet, such as burrs, lips, and uneven surfaces, without human intervention.

According to other non-limiting aspects of the present disclosure, the first end effector 12, the second end effector 14, the first link 26, and the second link 28 can include any number of geometric orientations such that the guide tubes 20, 22 and/or grippers 30 are configured to accommodate the intended application and/or preferences of the user. For example, in some non-limiting aspects, the second end effector 14 also includes a multi-planar bracket, and the grippers 30 of the first end effector 12 can be positioned in a different plane than the grippers 30 of the second end effector 12. Thus, the manipulator 10 can accommodate tubesheets of different configurations, including coplanar tubesheets with discrete sections, and can seamlessly navigate discontinuities that occur between the sections without human intervention. In still other non-limiting aspects, the manipulator 10 can be modularly configured to accommodate end effectors of numerous geometric configurations, such that the same manipulator 10 can be modified and implemented across a wide variety of tubesheets and applications.

The articulation assembly 24 can be configured with a variety of mechanisms to improve the precision with which the manipulator 10 is moved. For example, the manipulator 10 of FIG. 3 includes a first motor 32 aligned with the first axis A1, a second motor 34 aligned with the second axis A2, and a third motor 36 aligned with the third axis A3. The first motor 32, the second motor 34, and the third motor 36 of articulation assembly 24 can be specifically selected and configured to enhance the maneuverability of the manipulator 10. For example, the first motor 32, second motor 34, and third motor 36 can be stepper motors, geared servo motors, piezoelectric motors, or any combination thereof. Of course, the present disclosure contemplates other non-limiting aspects wherein the articulation assembly 24 includes any number of controllable, rotary, actuators. tailored to its intended application.

Additionally, the manipulator 10 can include a processor configured to communicate with a control circuit. The processor can be configured to execute instructions stored in a memory either coupled to the manipulator 10, or remotely located. In still other non-limiting aspects, the manipulator 10 can include a receiver and/or a transmitter configured to communicate with a remote source of instructions. Accordingly, the processor can command the articulation assembly 24 of the manipulator 10 to perform a series of maneuvers based on instructions stored in the memory. Alternatively and/or additionally, the processor can command the articulation assembly 24 of the manipulator 10 to perform a series of maneuvers based on instructions it receives in real-time from a user in a remote location. Thus, a user can either deploy the manipulator 10 for autonomous inspection and/or service of the tubesheet, or remotely command the manipulator 10 to inspect and/or service the heat exchanger. In other non-limiting aspects, the manipulator can be configured to autonomously perform a series of maneuver and a user can override the autonomous control as needed. Regardless, the manipulator 10 can be specifically configured to minimize the risk of human exposure to radiation.

Figure 4:
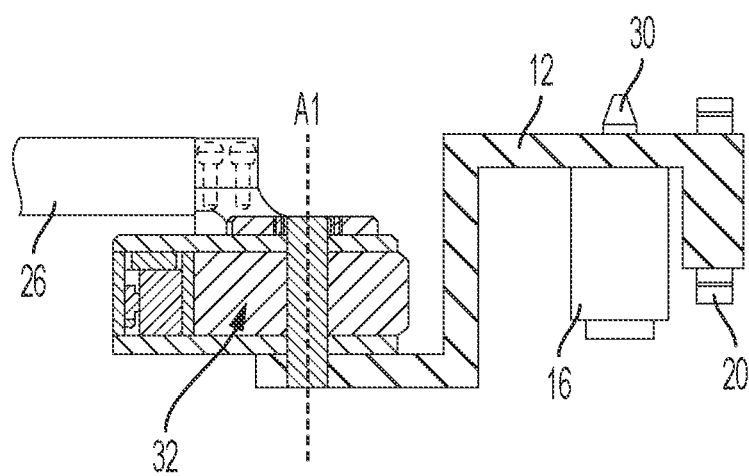
FIG. 4 illustrates a sectioned view taken along line 4-4 of FIG. 2.
Figure 5:
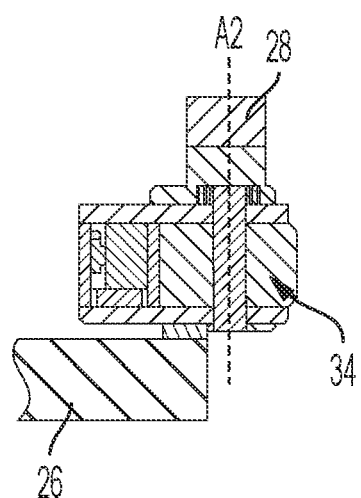
FIG. 5 illustrates a sectioned view taken along line 5-5 of FIG. 2.

Referring now to FIGS. 4 and 5, the articulation assembly 24 is further illustrated in more detail. For example, FIG. 4 illustrates a sectioned view of the manipulator 10 taken along line 4-4 of FIG. 2. FIG. 5 illustrates a sectioned view of the manipulator 10 taken along line 5-5 of FIG. 2. The first motor 32, the second motor 34, or the third motor 36 of the articulation assembly 24 can include any number of mechanisms to ensure the proper routing of wires and prevent entanglement while the manipulator 10 maneuvers about the tubesheet. For example, in some non-limiting aspects, a slip ring assembly can be positioned about the first axis A1, the second axis A2, or the third axis A3 of the manipulator 10 to suit the needs of the intended application and further enhance the maneuverability of the manipulator.

In further reference to FIGS. 4 and 5, the manipulator 10 can further include gearing assemblies to manage the rotation of the first end effector 12, the second end effector 14, the first articulation link 26, and the second articulation link 28, relative to one another. For example, various gears can be installed about the first axis A1, the second axis A2, and/or the third axis A3 to increase or decrease a speed of rotation, reverse the direction of rotation, and transmit rotational motion to a preferred axis. Additionally and/or alternatively, the manipulator 10 can include a transmission. Accordingly, the manipulator 10 can be specifically configured to manage the torque applied to the first end effector 12, the second end effector 14, the first articulation link 26, and/or the second articulation link 28, depending on its intended application or user preference.

Figure 7:
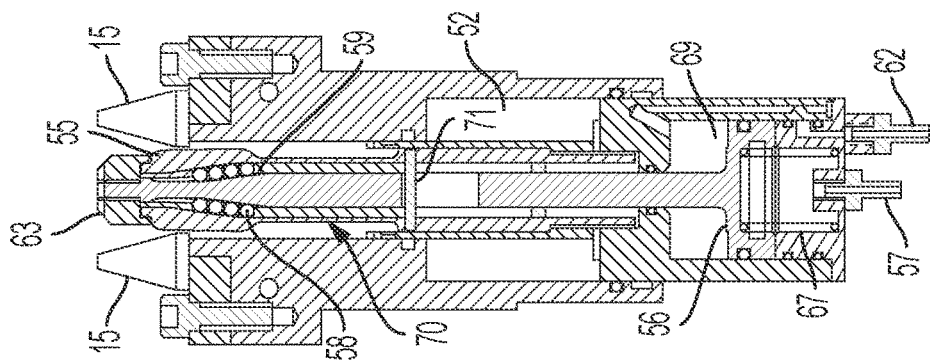
FIG. 7 illustrates a sectioned view taken along line 7-7 of FIG. 6, in accordance with at least one non-limiting aspect of the present disclosure.
Figure 6:
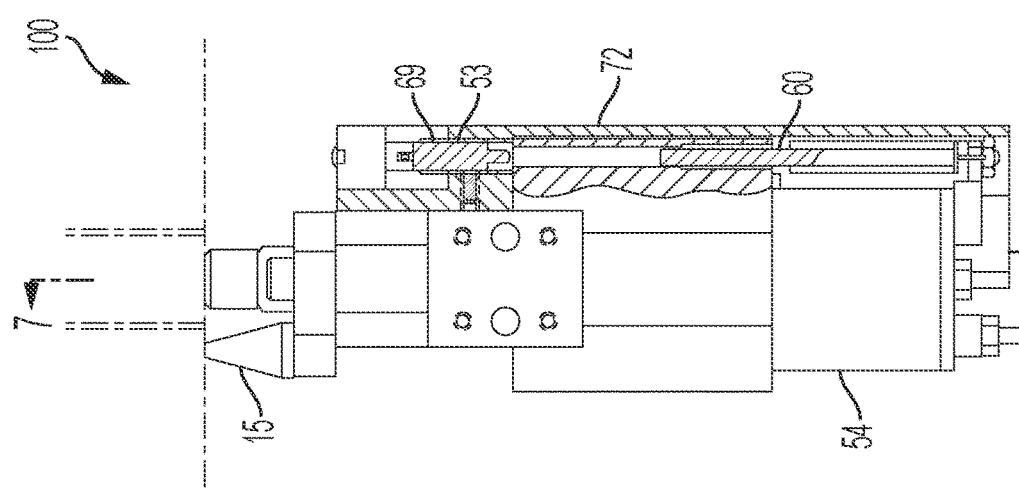
FIG. 6 illustrates an elevation view of a gripper to secure the articulated manipulator of FIG. 1 to a tubesheet of the heat exchanger of the nuclear power electrical generation plants.

Referring now to FIG. 6, an elevation view of a gripper assembly 100 to secure the articulated manipulator 10 of FIG. 1 to a tubesheet of the heat exchanger of the nuclear power electrical generation plants is depicted in accordance with at least one aspect of the present disclosure. FIG. 7 illustrates a sectioned view taken along line 7-7 of FIG. 6, in accordance with at least one non-limiting aspect of the present disclosure. Specifically, the gripper assembly 100 includes a camlock configuration. In the non-limiting aspect of FIG. 6, standoff pins 15 are placed in contact with the tubesheet using the articulation assembly 24 of FIG. 3. Compressed air can be released from chamber 52 (FIG. 7) through a fitting, permitting springs 53 to raise a cylinder 54 and place gripper fingers 55 (FIG. 7) within a steam generator tube. Guide pin 60 maintains alignment of the cylinder 54 with the gripper. A limit switch 69, which is actuated by the guide pin 60, can be used to verify insertion.

In further reference to FIGS. 6 and 7, the guide pin 60 is protected within housing 72. The limit switch has three functions: (1) To assure that the gripper is in the full up position prior to activation of the gripper fingers 55 to press out against the corresponding heat exchanger tubes; (2) To detect if the camlock does not fully grip the corresponding heat exchanger tube (the limit switch will indicate that the gripper is not fully up when the gripper is pulled downward after the gripper fingers are radially extenuated, to fully seat the robot standoff pins 15 against the tubesheet 65); and (3) To detect if there is a missing tube, e.g., at the end of a row or column, or a plugged tube, because the gripper will not fully insert. This latter feature can be used to verify the position of the robot as it moves across the tubesheet and is a significant feature of this invention. With the gripper fingers 55 inserted in the tube, actuator piston 56 is forced upward with compressed air supplied through fitting 57. As the actuator piston travels upward, balls 58 roll on tapered raceways 59 bringing gripper fingers in tight contact with the tube. Balls are used to reduce friction between the gripper fingers and the actuator piston enabling a high contact force, e.g., approximately 1,000 lbs., to be obtained with a relatively small pneumatic piston diameter. The low rolling friction of the balls eliminates the self-locking property of small angle tapers. The next operational sequence for the gripper is to pressurize chamber 52 which attempts to remove the gripper fingers from the tube. Since the gripper fingers are secured to the tube, the entire gripper is biased upward forcing pins 15 in close contact with the tubesheet. With the pins tightly against the tubesheet, the manipulator is forced to stay parallel and in close proximity to the tubesheet.

Still referring to FIGS. 6 and 7, the removal of the gripper from the tube can be performed as follows. Compressed air is expelled from chamber 52 relieving the force on the gripper fingers 55. The actuator pin is lowered by introducing compressed air into fitting 62 while releasing air through fitting 57. Nose cone 63 ensures the balls are returned to their original position and that gripper fingers 55 are captured. The actuator cylinder 54 is then lowered by pressurizing chamber 52.

Figure 8:
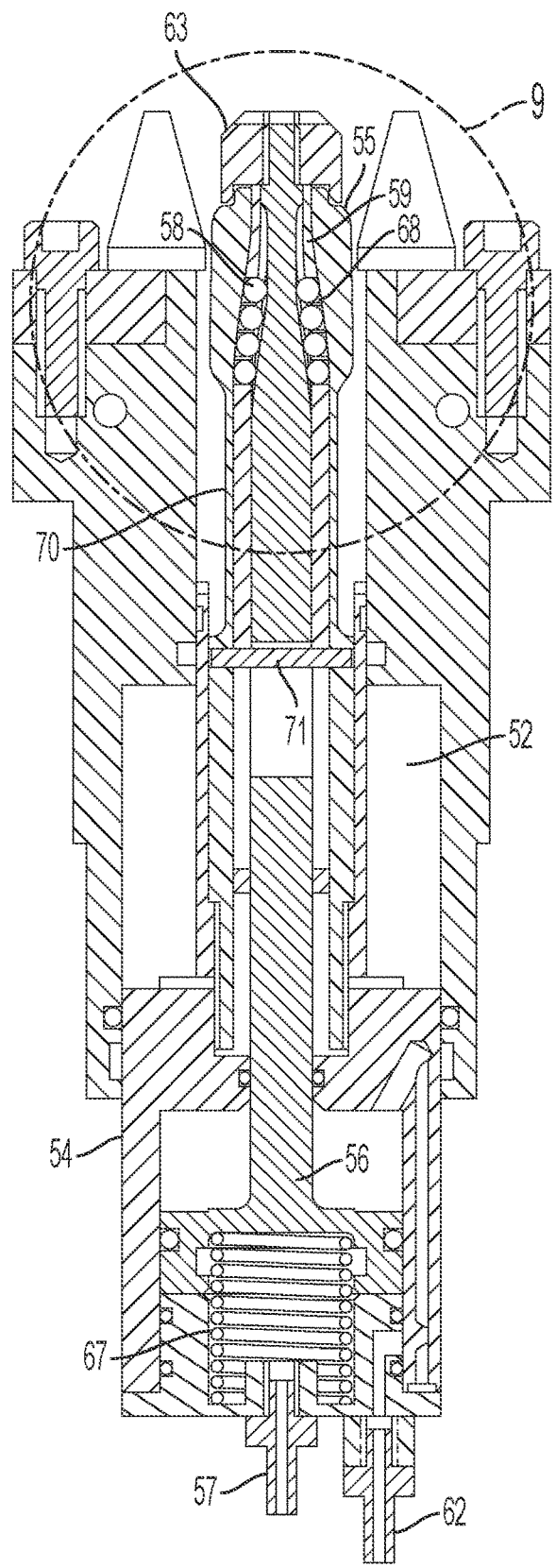
FIG. 8 illustrates a sectioned view taken along line 7-7 of FIG. 6, in accordance with a second non-limiting aspect of the present disclosure.

FIG. 8 illustrates a sectioned view taken along line 7-7 of FIG. 6, in accordance with another non-limiting aspect of the present disclosure. Like reference characters refer to the corresponding elements previously described with respect to FIG. 7. The difference in the aspect of FIG. 8 over that of FIG. 7 is that a spring 67 has been added around the top of the actuator piston 56 to bias the fingers 55 against the corresponding heat exchanger tube when the fingers are inserted within the tube to prevent an unintentional release. Additionally, the ball bearings 58 are retained within a sleeve, but travel as previously stated along the raceway when the piston 56 is actuated to force the fingers 55 radially outward.

Figure 9:
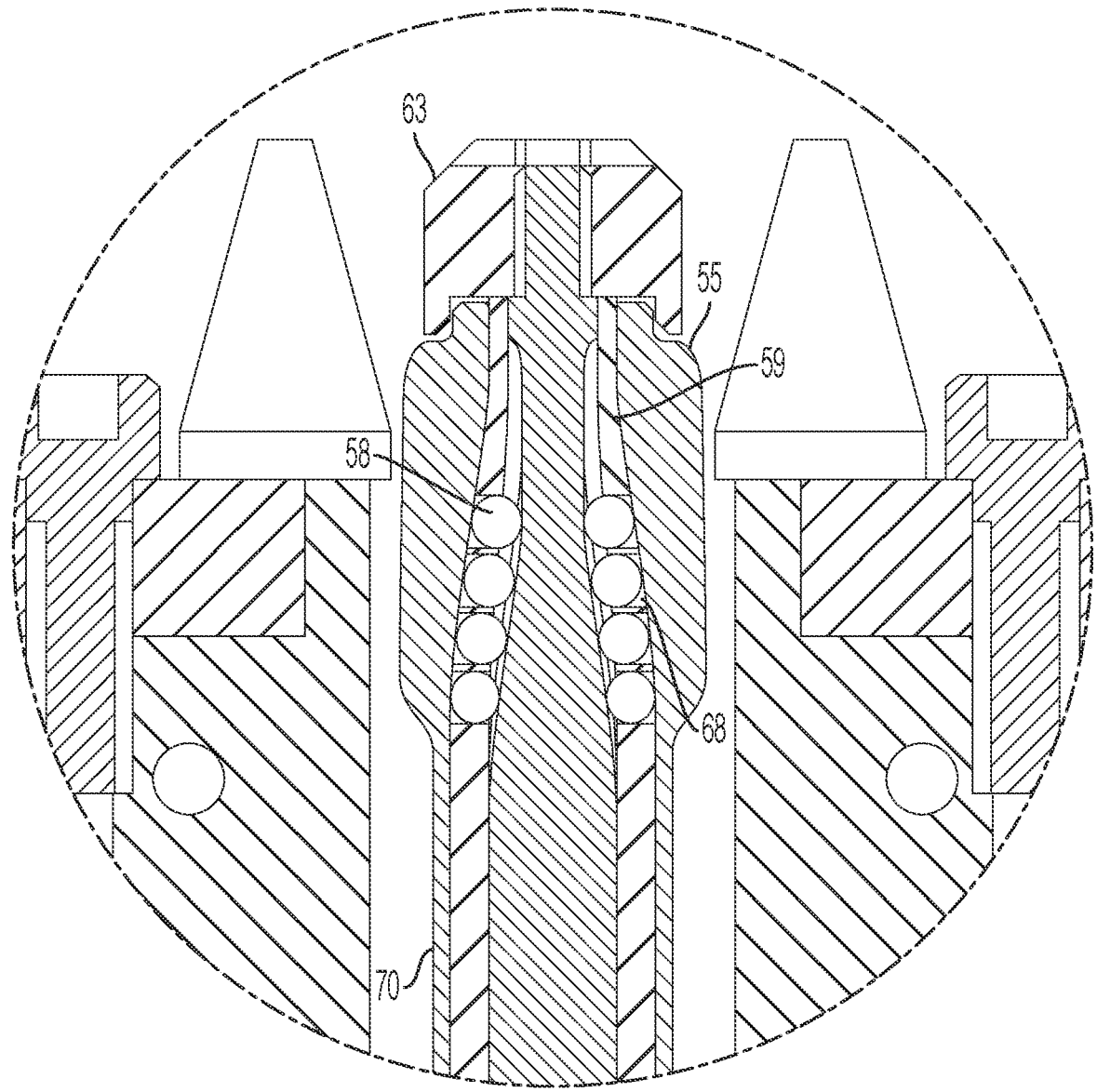
FIG. 9 is an enlarged view of the gripping finger area of the gripper illustrated in FIG. 8.

FIG. 9 is an enlarged view of the gripping finger area of the gripper illustrated in FIG. 8. It can be appreciated that the bearings 58 are retained within a sleeve 68 each supported within its own pocket and free to roll as the actuator piston moves up to force the fingers 55 radially outward. To retract the gripper fingers 55 air is introduced through the fitting 62 to force the piston in the opposite direction and the fingers 55 are forced inward, in turn forcing the ball bearings 58 within the sleeve 68 downward until they are seated at their lower extent of travel and the fingers 55 are captured by the nose cone 63. The bearing balls 58 will be forced to the lowest position when the nose cone 63 is retracted. This assures the gripper fingers 55 will be fully collapsed when the actuator piston 56 and guide 70 are retracted. The guide 70, actuator 56 and gripper fingers 55 are held rotationally fixed, with the small horizontal pin 71 in the center of the camlock to assure the balls 58 are retained in the raceways and do not move to the open slots between the gripper fingers 55. In total, there are 24 balls circumferentially-spaced in six axially-extending rows positioned substantially equidistantly, circumferentially around the actuator piston 56. However, in other non-limiting aspects, the specific number and configuration of rows and/or balls can vary, depending on the intended application.

It is worth noting that the gripper configurations depicted in FIGS. 6-9 are exclusively presented for illustrative purposes to enable the present disclosure. It will be appreciated that the manipulator 10 disclosed herein can include any number of mechanisms to secure it a tubesheet. Accordingly, the term "gripper", as used by the present disclosure, shall be interpreted with great breadth and shall not exclude any mechanism capable of securing an end effector 12, 14 of the manipulator 10 to a tubesheet.

Various aspects of the subject matter described herein are set out in the following numbered clauses:

Clause 1: A manipulator configured to navigate a heat exchanger, wherein the heat exchanger includes a plurality of tubes extending through a tubesheet, the manipulator including a first end effector configured to accommodate an instrument configured to service the heat exchanger, wherein the first end effector includes a first actuator coupled to a first gripper, wherein the first actuator is configured to extend the first gripper into a tube of the plurality of tubes, and wherein the first gripper is configured to secure the manipulator to the tubesheet, a second end effector including a second actuator coupled to a second gripper, wherein the second actuator is configured to extend into a tube of the plurality of tubes, and wherein the second gripper is configured to secure the manipulator to the tubesheet, and an articulation assembly including a first link and a second link, wherein the first link is pivotally connected to the first end effector and rotatable about a first axis, wherein the first link is pivotally connected to the second link and rotatable about a second axis, and wherein the second link is pivotally connected to the second end effector and rotatable about a third axis, wherein, when the second gripper is securing the manipulator to the tubesheet, the articulation assembly is configured to enable the first end effector to move relative to the second end effector in a plane that is parallel to the tubesheet.

Clause 2: The manipulator according to clause 1, wherein the second end effector is configured to accommodate an instrument configured to service the heat exchanger, and wherein, when the first gripper is securing the manipulator to the tubesheet, the articulation assembly is configured to enable the second end effector to move relative to the first end effector in a plane that is parallel to the tubesheet.

Clause 3: The manipulator according to clauses 1 or 2, wherein the articulation assembly includes a motor configured to move the first end effector relative to the second end effector.

Clause 4: The manipulator according to any of clauses 1-3, further including a control circuit coupled to the first end effector, the second end effector, and the articulation assembly, wherein control circuit is configured to command the motor to move the first end effector relative to the second end effector based on an instruction.

Clause 5: The manipulator according to any of clauses 1-4, wherein the control circuit is further configured to receive the instruction from a remote computer system.

Clause 6: The manipulator according to any of clauses 1-5, wherein the control circuit is further configured to retrieve the instruction from a memory.

Clause 7: The manipulator according to any of clauses 1-6, further including an instrument mechanically coupled to the first end effector.

Clause 8: The manipulator according to any of clauses 1-7, further comprising a guide tube configured to engage with and guide an externally inserted instrument to a proper position on the tubesheet to service the heat exchanger.

Clause 9: The manipulator according to any of clauses 1-8, further including an instrument configured to induce an electromagnetic field and detect variations in the induced magnetic field and characterize a surface and/or a sub-surface of the heat exchanger based on a detected variation in the induced magnetic field.

Clause 10: The manipulator according to any of clauses 1-9, a modular connector configured to selectively engage with the first end effector, such that the first end effector is interchangeable and can be decoupled from the manipulator.

Clause 11: The manipulator according to any of clauses 1-10, wherein the first gripper includes a mechanism configured to move laterally and apply pressure on an inner wall of a tube of the plurality of tubes.

Clause 12: The manipulator according to any of clauses 1-11, wherein the first gripper includes a camlock mechanism including a plurality of expandable fingers, wherein each expandable finger of the plurality of expandable fingers is configured to apply pressure on an inner surface of a tube of the plurality of tubes.

Clause 13: A system configured to service a heat exchanger, wherein the heat exchanger includes a plurality of tubes extending through a tubesheet, the system including a manipulator including a first end effector configured to accommodate an instrument configured to service the heat exchanger, wherein the first end effector includes a first actuator coupled to a first gripper, wherein the first actuator is configured to extend the first gripper into a tube of the plurality of tubes, and wherein the first gripper is configured to secure the manipulator to the tubesheet, a second end effector including a second actuator coupled to a second gripper, wherein the second actuator is configured to extend into a tube of the plurality of tubes, and wherein the second gripper is configured to secure the manipulator to the tubesheet, and an articulation assembly including a first link, a second link, and a motor, wherein the first link is pivotally connected to the first end effector and rotatable about a first axis, wherein the first link is pivotally connected to the second link and rotatable about a second axis, and wherein the second link is pivotally connected to the second end effector and rotatable about a third axis, and a control circuit coupled to the first end effector, the second end effector, and the articulation assembly, wherein control circuit is configured to command the motor to move the first end effector relative to the second end effector in a plane that is parallel to the tubesheet, based on an instruction.

Clause 14: The system according to clause 13, wherein the second end effector is configured to accommodate an instrument configured to service the heat exchanger, and wherein, when the first gripper is securing the manipulator to the tubesheet, the command circuit is further configured to command the motor to move the second end effector relative to the first end effector in a plane that is parallel to the tubesheet, based on the instruction.

Clause 15: The system according to clause 13 or 14, further comprising an instrument configured to induce an electromagnetic field and detect variations in the induced magnetic field and characterize a surface and/or a sub-surface of the heat exchanger based on a detected variation in the induced magnetic field.

Clause 16: The system according to any of clauses 13-15, further including a computer system, wherein the control circuit is further configured to receive the instruction from the computer system.

Clause 17: The system according to any of clauses 13-16, further including a memory configured to store the instruction, wherein the control circuit is further configured to retrieve the instruction from the memory.

Clause 18: A method of servicing a heat exchanger including a plurality of tubes extending through a tubesheet using a manipulator including a first end effector configured to accommodate an instrument configured to service the heat exchanger, wherein the first end effector includes a first actuator configured to extend a first gripper into a tube of the plurality of tubes, a second end effector configured to accommodate a second instrument configured to service the heat exchanger, wherein the second end effector includes a second actuator configured to extend a second gripper into a tube of the plurality of tubes, and an articulation assembly including a first link, a second link, and a motor configured to move the first end effector relative to the second end effector in a plane that is parallel to the tubesheet, wherein the first gripper and second gripper are configured to secure the manipulator to the tubesheet, the method including extending the second gripper into a tube of the plurality of tubes, securing, by the second gripper, the manipulator to the tubesheet, moving, by the motor, the first end effector relative to the second end effector in a plane that is parallel to the tubesheet, until the first end effector arrives at a first desired location; and servicing, by the first instrument, the heat exchanger about the first desired location.

Clause 19: The method according to clause 18, wherein the motor is further configured to move the second end effector relative to the first end effector in a plane that is parallel to the tubesheet, the method further including extending the first gripper into a tube of the plurality of tubes, securing, by the first gripper, the manipulator to the tubesheet, moving, by the motor, the second end effector relative to the first end effector in a plane that is parallel to the tubesheet, until the second end effector arrives at a second desired location, and servicing, by the second instrument, the heat exchanger about the second desired location.

Clause 20: The method according to clause 18 or 19, wherein servicing the heat exchanger further includes inducing, by the first instrument, an electromagnetic field, detecting, by the first instrument, variations in the induced magnetic field, and characterizing, by the first instrument, a surface and/or a sub-surface of the heat exchanger based on a detected variation in the induced magnetic field.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative aspects. The aspects described herein are understood as providing illustrative features of varying detail of various aspects of the disclosed invention; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the disclosed invention. Accordingly, it will be recognized by persons having ordinary skill in the art that various substitutions, modifications or combinations of any of the exemplary aspects may be made without departing from the scope of the invention. In addition, persons skilled in the art will recognize, or be able to ascertain using no more than routine experimentation, many equivalents to the various aspects of the invention described herein upon review of this specification. Thus, the invention is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 20%, 15%, 10%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Also, all ranges recited herein are inclusive of the end points of the recited ranges. For example, a range of "1 to 10" includes the end points 1 and 10. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

What is claimed is:

1. A manipulator configured to navigate a heat exchanger, wherein the heat exchanger includes a plurality of tubes extending through a tubesheet, the tubesheet having a planar face, the manipulator comprising:
a first end effector comprising a guide tube configured to accommodate an instrument configured to perform a service on the heat exchanger, wherein the first end effector comprises a first actuator coupled to a first gripper, wherein the first actuator is configured to extend the first gripper into a tube of the plurality of tubes, wherein the first gripper is configured to secure the first end effector to the tubesheet, wherein the first end effector defines a first surface;
a second end effector comprising a second actuator coupled to a second gripper, wherein the second actuator is configured to extend the second gripper into a tube of the plurality of tubes, and wherein the second gripper is configured to secure the second end effector to the tubesheet, wherein the second end effector defines a second surface; and
an articulation assembly configured to enable pivotal motion of the first end effector relative to the second end effector, wherein the articulation assembly comprises a first link and a second link, wherein the first link is pivotally connected to the first end effector and rotatable about a first axis, wherein the pivotal connection between the first link and the first end effector constrains the first link to movement within a first plane that is parallel to the first surface, wherein the first link is pivotally connected to the second link and rotatable about a second axis, wherein the pivotal connection between the first link and the second link constrains the second link to movement within a second plane that is parallel to the first plane, wherein the second link is pivotally connected to the second end effector and rotatable about a third axis, wherein the pivotal connection between the second link and the second end effector constrains the second surface to movement within a third plane that is parallel to the second plane, wherein the third plane is defined by the second surface of the second end effector;
wherein, when the second gripper has secured the manipulator to the tubesheet, the articulation assembly is configured to move the first end effector to a location the service is to be performed on the heat exchanger relative to the second end effector such that the first surface of the first end effector is constrained to movement within the third plane defined by the second surface of the second end effector, wherein the third plane is parallel to the planar face of the tubesheet.

2. The manipulator of claim 1, wherein the second end effector is configured to accommodate an instrument configured to service the heat exchanger, and wherein, when the first gripper is securing the manipulator to the tubesheet, the articulation assembly is configured to enable the second end effector to move relative to the first end effector in the third plane that is parallel to the tubesheet.

3. The manipulator of claim 1, wherein the articulation assembly comprises a motor configured to move the first end effector relative to the second end effector.

4. The manipulator of claim 3, further comprising a control circuit coupled to the first end effector, the second end effector, and the articulation assembly, wherein control circuit is configured to command the motor to move the first end effector relative to the second end effector based on an instruction.

5. The manipulator of claim 4, wherein the control circuit is further configured to receive the instruction from a remote computer system.

6. The manipulator of claim 4, wherein the control circuit is further configured to retrieve the instruction from a memory.

7. The manipulator of claim 1, further comprising an instrument mechanically coupled to the first end effector.

8. The manipulator of claim 1, wherein the guide tube is further configured to guide the instrument to a proper position on the tubesheet to service the heat exchanger.

9. The manipulator of claim 1, further comprising an instrument configured to induce an electromagnetic field and detect variations in the induced magnetic field and characterize a surface and/or a sub-surface of the heat exchanger based on a detected variation in the induced magnetic field.

10. The manipulator of claim 1, further comprising a modular connector configured to selectively engage with the first end effector, such that the first end effector is interchangeable and can be decoupled from the manipulator.

11. The manipulator of claim 1, wherein the first gripper comprises a mechanism configured to move laterally and apply pressure on an inner wall of a tube of the plurality of tubes.

12. The manipulator of claim 1, wherein the first gripper comprises a camlock mechanism comprising a plurality of expandable fingers, wherein each expandable finger of the plurality of expandable fingers is configured to apply pressure on an inner surface of a tube of the plurality of tubes.

13. The manipulator of claim 1, wherein the first axis is parallel to the second axis and the third axis.

14. The manipulator of claim 1, wherein the first link and the second link are pivotally connected to each other by a single pivot pin defining the second axis.

15. A system configured to service a heat exchanger, wherein the heat exchanger comprises a plurality of tubes extending through a tubesheet, the system comprising:
a manipulator comprising:
a first end effector comprising a first actuator coupled to a first gripper and a guide tube configured to accommodate an instrument configured to service the heat exchanger, wherein the first actuator is configured to extend the first gripper into a tube of the plurality of tubes, and wherein the first gripper is configured to secure the manipulator to the tubesheet, wherein the first end effector defines a first surface;
a second end effector comprising a second actuator coupled to a second gripper, wherein the second actuator is configured to extend the second gripper into a tube of the plurality of tubes, and wherein the second gripper is configured to secure the manipulator to the tubesheet, wherein the second end effector defines a second surface; and
an articulation assembly configured to enable pivotal motion of the first end effector relative to the second end effector, wherein the articulation assembly comprises a first link, a second link, a first motor, a second motor, and a third motor, wherein the first link is pivotally connected to the first end effector by the first motor and the first link is rotatable about a first axis, wherein the first link is only movable within a first plane that is parallel to the first surface, wherein the first link is pivotally connected to the second link by the second motor and the second link is rotatable relative to the first link about a second axis, wherein the second link is only movable within a second plane that is parallel to the first plane, wherein the second link is pivotally connected to the second end effector by the third motor and the second end effector is rotatable relative to the second link about a third axis, and wherein the second end effector is only movable within a third plane that is parallel to the second plane, the third plane defined by the second surface of the second end effector; and
a control circuit coupled to the first end effector, the second end effector, and the articulation assembly, wherein the control circuit is configured to cause one of the first motor, the second motor, or the third motor to move the first end effector relative to the second end effector only within the third plane defined by the second surface of the second end effector, based on an instruction, when the second gripper has secured the manipulator to the tubesheet.

16. The system of claim 15, wherein the second end effector is configured to accommodate an instrument configured to service the heat exchanger, and wherein, when the first gripper is securing the manipulator to the tubesheet, the control circuit is further configured to command one of the first motor, the second motor, or the third motor to move the second end effector relative to the first end effector in a plane that is parallel to the tubesheet, based on the instruction.

17. The system of claim 15, further comprising an instrument configured to induce an electromagnetic field and detect variations in the induced magnetic field and characterize a surface and/or a sub-surface of the heat exchanger based on a detected variation in the induced magnetic field.

18. The system of claim 15, further comprising a computer system, wherein the control circuit is further configured to receive the instruction from the computer system.

19. The system of claim 15, further comprising a memory configured to store the instruction, wherein the control circuit is further configured to retrieve the instruction from the memory.

20. The manipulator of claim 15, wherein the first link and the second link are pivotally connected to each other by a single pivot defining the second axis.

21. A manipulator configured to navigate a heat exchanger, wherein the heat exchanger includes a plurality of tubes extending through a tubesheet, the tubesheet having a planar face, the manipulator comprising:
a first end effector comprising a guide tube configured to accommodate an instrument configured to perform a service on the heat exchanger, wherein the first end effector comprises a first gripper configured to secure the first end effector to the tubesheet, wherein the first end effector defines a first surface;
a second end effector comprising a second gripper configured to secure the second end effector to the tubesheet, wherein the second end effector defines a second surface; and
an articulation assembly, comprising:
a first link pivotally connected to the first end effector and rotatable about a first axis, wherein the pivotal connection between the first link and the first end effector physically constrains the first link to movement within a first plane that is parallel to the first surface;
a second link pivotally connected to the first link and rotatable about a second axis, wherein the pivotal connection between the second link and the first link physically constrains the second link to movement within a second plane that is parallel to the first plane, wherein the second link is pivotally connected to the second end effector and rotatable about a third axis, wherein the pivotal connection between the second link and the second end effector physically constrains the second surface to movement within a third plane that is parallel to the second plane, wherein the third plane is defined by the second surface of the second end effector;
wherein, when the second gripper has secured the manipulator to the tubesheet, the articulation assembly is configured to move the first end effector to a location the service is to be performed on the heat exchanger relative to the second end effector such that the first surface of the first end effector is physically constrained to movement within the third plane defined by the second surface of the second end effector, wherein the third plane is parallel to the planar face of the tubesheet.

22. The manipulator of claim 21, wherein the first link and the second link are pivotally connected to each other by a single pivot pin defining the second axis.

\* \* \* \* \*